(12) United States Patent
Takayanagi et al.

(10) Patent No.: US 7,800,922 B2
(45) Date of Patent: Sep. 21, 2010

(54) SWITCHING POWER SUPPLY UNIT

(75) Inventors: Yoshinobu Takayanagi, Tokyo (JP); Kunihiro Sato, Tokyo (JP)

(73) Assignee: TDK Corporation, Tokyo (JP)

( * ) Notice: Subject to any disclaimer, the term of this patent is extended or adjusted under 35 U.S.C. 154(b) by 440 days.

(21) Appl. No.: 11/976,289

(22) Filed: Oct. 23, 2007

(65) Prior Publication Data
US 2008/0094859 A1  Apr. 24, 2008

(30) Foreign Application Priority Data
Oct. 24, 2006 (JP) .............................. 2006-288828

(51) Int. Cl.
H02M 3/335 (2006.01)
G05F 1/33 (2006.01)
(52) U.S. Cl. .......................... 363/17; 323/251; 323/267
(58) Field of Classification Search .................. 363/16, 363/17, 79, 80, 88, 98; 323/247, 250, 251, 323/267
See application file for complete search history.

(56) References Cited

U.S. PATENT DOCUMENTS

| | | | | | |
|---|---|---|---|---|---|
| 4,232,254 | A | * | 11/1980 | Haferl | 315/408 |
| 5,521,487 | A | * | 5/1996 | Liu | 323/207 |
| 5,621,625 | A | * | 4/1997 | Bang | 363/21.1 |
| 6,038,147 | A | | 3/2000 | Jacobs et al. | |
| 6,867,570 | B2 | * | 3/2005 | Vithayathil et al. | 323/205 |
| 7,102,898 | B2 | * | 9/2006 | Brkovic | 363/19 |
| 2008/0198632 | A1 | * | 8/2008 | Takayanagi | 363/17 |

FOREIGN PATENT DOCUMENTS

| | | |
|---|---|---|
| JP | A 03-118772 | 5/1991 |
| JP | A 08-317575 | 11/1996 |
| JP | A 09-065509 | 3/1997 |
| JP | A 2000-209867 | 7/2000 |
| JP | A 2003-259637 | 9/2003 |

OTHER PUBLICATIONS

Tao et al.; "Family of Multiport Bidirectional DC-DC Converters," IEE Proceedings: Electric Power Applications, Institution of Electrical Engineers, GB, vol. 153, No. 3, May 1, 2006, pp. 451-458, XP006026473, ISSN: 1350-2352.

(Continued)

*Primary Examiner*—Jessica Han
(74) *Attorney, Agent, or Firm*—Oliff & Berridge, PLC

(57) ABSTRACT

A switching power supply unit is provided, which can output a DC voltage and an AC voltage with a minimized installation space. A switching circuit is provided between a winding of a transformer and a main battery. A rectifier circuit is provided between other windings of the transformer and an accessory battery. Output terminals for outputting an AC output voltage are provided at the other side of the transformer, the AC output voltage being generated based on a DC input voltage inputted from the main battery. A DC output voltage and the AC output voltage are generated based on the DC input voltage, and then outputted. The transformer is shared by a generation path of the DC output voltage and a generation path of the AC output voltage. An AC voltage input section to be inputted with the AC input voltage from external equipment may be provided at the other side of the transformer.

6 Claims, 12 Drawing Sheets

OTHER PUBLICATIONS

Klontz et al., "Converter Selection for Electric Vehicle Charger Systems With A High-Frequency High-Power Link," Proceedings of the Annual Power Electronics Specialists Conference, (PESC), Seattle, Jun. 20-25, 1993; [Proceedings of the Annual Power Electronics Specialists Conference. (PESC)], New York, IEEE, US, vol. CONF. 24, Jun. 20, 1993, pp. 855-861, XP010148968, ISBN: 978-0-7803-1243-2, p. 855; figure 4.

Feb. 5, 2010 European Search Report issued in EP 07 02 0838.

* cited by examiner

FIG. 5

SWITCHING POWER SUPPLY UNIT

BACKGROUND OF THE INVENTION

1. Field of the Invention

The present invention relates to a switching power supply unit configured to produce switching output obtained by switching DC input voltage at an output winding of a power conversion transformer.

2. Background Art

Generally, an electric vehicle is equipped with a low voltage battery (accessory battery) for outputting a low DC voltage such as about 14 V as a power supply for driving in-vehicle instruments (accessories) such as a wiper, a headlight, a room light, an audio instrument, an air conditioner, and various measuring instruments, and equipped with a high voltage battery (main battery) for outputting a high DC voltage such as about 350 to 500 V as a power supply for driving a motor. Typically, such a low voltage battery is charged by rectifying an AC output voltage from an AC generator driven in terms of rotation of an engine to obtain a high DC voltage, and converting such a DC input voltage into a relatively low DC voltage using a switching power supply unit (DC/DC converter), and then supplying the low DC voltage to the low voltage battery. The high voltage battery is charged by supplying the DC input voltage from an engine side to the high voltage battery. For example, as described in Japanese Unexamined Patent Publication No. 2003-259637, the switching power supply unit performs voltage conversion by temporarily converting a DC input voltage into an AC voltage using an inverter circuit, then transforming the AC voltage using a voltage conversion transformer and reconverting the transformed AC voltage into a DC voltage using a rectifier circuit or the like.

SUMMARY OF THE INVENTION

For example, when such a DC/DC converter is applied to the electric vehicle, output of a so-called, commercial power voltage is sometimes required in addition to a DC voltage in order to activate electric instruments at engine start and during car running. Therefore, in such a case, a DC/AC inverter has been separately provided in addition to the DC/DC converter.

However, when the DC/DC converter and the DC/AC inverter are separately provided in such a way, there has been a difficulty that the number of components is increased, leading to increase in installation space of a switching power supply as a whole.

In view of forgoing, it is desirable to provide a switching power supply unit that can output a DC voltage and an AC voltage with a minimized installation space.

A switching power supply unit of an embodiment of the invention has a transformer including a first transformer coil, a second transformer coil, and a third transformer coil, the transformer coils being magnetically coupled with one another; a first switching circuit disposed between the first transformer coil and a first DC power supply; a rectifier circuit disposed between the second transformer coil and a second DC power supply; and a second switching circuit disposed between the third transformer coil and AC voltage output terminals.

In the switching power supply unit of an embodiment of the invention, when a DC input voltage is inputted from the first DC power supply, the first switching circuit acts as an inverter circuit, and the inputted DC input voltage is converted into a pulse voltage by the first switching circuit, and the pulse voltage is transformed by a transformer. Then, the transformed pulse voltage is rectified by the rectifier circuit, and the rectified voltage is supplied to the second DC power supply as a DC output voltage. On the other hand, a high frequency voltage is generated at a side of the third transformer coil based on the DC input voltage, the high frequency voltage is converted into an AC output voltage by the second switching circuit, and the AC output voltage is outputted from the AC voltage output terminals to external equipment. In this way, the DC output voltage and the AC output voltage are generated based on the DC input voltage inputted from the first DC power supply via a transformer common to one another. Each of the "AC output voltage" and the "AC input voltage" means a voltage used as a power voltage for electric instruments, that is, means a so-called commercial power voltage.

In the switching power supply unit of an embodiment of the invention, it is preferable that the transformer has a fourth transformer coil being magnetically coupled with each of the first, second, and third transformer coils, and a third switching circuit disposed between the fourth transformer coil and AC voltage input terminals is further provided, and the first switching circuit is configured to include a bidirectional switch. In the case of such a configuration, when the AC input voltage is inputted from the AC voltage input terminals, a pulse voltage based on the AC input voltage is generated by the third switching circuit, and the first switching circuit acts as a rectifier circuit. Therefore, a voltage is supplied to at least one of the first switching circuit and the rectifier circuit based on the inputted AC input voltage, and thus a DC voltage is supplied to at least one of the first DC power supply and the second DC power supply. Accordingly, for example, even if the DC input voltage is not supplied from the first DC power supply, the AC input voltage is inputted from external equipment (for example, so-called commercial power supply), so that a DC power supply can be charged.

In this case, it is preferable that a power factor correction circuit is further provided between the third switching circuit and the AC voltage input terminals. In the case of such a configuration, when the AC input voltage is subjected to voltage conversion, the power factor is corrected, consequently a ripple voltage is reduced. Moreover, it is preferable that the third transformer coil also serves as the fourth transformer coil, and the third switching circuit is configured to include a bidirectional switch, and disposed between the third transformer coil and the AC voltage output terminals. In the case of such a configuration, since the AC output voltage is generated via the third switching circuit, a configuration of the unit is simplified.

In this case, the switching power supply unit can be configured such that the second switching circuit is disposed between the third switching circuit and the AC voltage output terminals.

According to the switching power supply unit of an embodiment of the invention, since the first switching circuit is provided between the first transformer coil and the first DC power supply, the rectifier circuit is provided between the second transformer coil and the second DC power supply, and the second switching circuit is provided between the third transformer coil and the AC voltage output terminals, the DC output voltage and the AC output voltage can be generated based on the DC input voltage, and then outputted. Moreover, a transformer can be shared by a generation path of the DC output voltage and a generation path of the AC output voltage. Accordingly, a switching power supply unit for outputting a DC voltage and an AC voltage can be configured with a minimized installation space compared with a usual case where transformers are provided on respective generation paths.

Other and further objects, features and advantages of the invention will appear more fully from the following description.

BRIEF DESCRIPTION OF THE DRAWINGS

FIG. 5 is a circuit diagram for explaining an example of energy transfer paths in the switching power supply unit of FIG. 4;

DETAILED DESCRIPTION OF THE PREFERRED EMBODIMENTS

Hereinafter, the best mode for carrying out an embodiment of the invention (hereinafter, simply called embodiment) will be described in detail with reference to drawings.

First Embodiment

Figure 1:
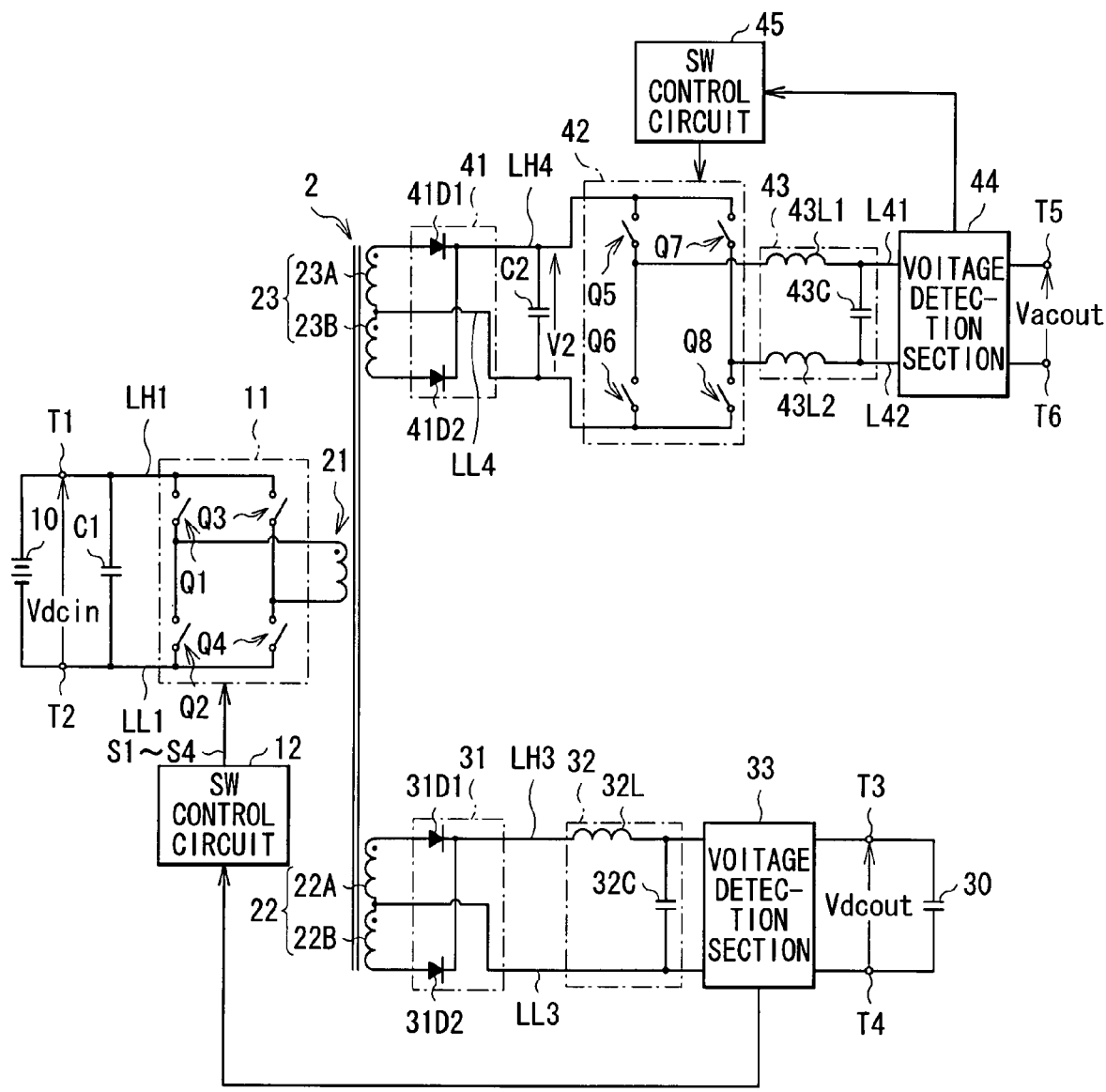
FIG. 1 is a circuit diagram showing a configuration of a switching power supply unit according to a first embodiment of the invention.

FIG. 1 shows a circuit configuration of a switching power supply unit according to a first embodiment of the invention. The switching power supply unit is applied to a car and the like, and has a transformer 2, a capacitor C1, a switching circuit 11, and an SW (switching) control circuit 12, those being provided at a side of a main battery 10 described later with respect to the transformer 2, and rectifier circuits 31 and 41, smoothing circuits 32 and 43, voltage detection sections 33 and 44, a switching circuit 42, and an SW (switching) control circuit 45, those being provided at a side of an accessory battery 20 described later with respect to the transformer 2.

The capacitor C1 is disposed between a high voltage line LH1 and a low voltage line LL1, and acts as a smoothing capacitor. One end of the high voltage line LH1 is connected to an input/output terminal T1, one end of the low voltage line LL1 is connected to an input/output terminal T2, and a main battery 10 is disposed between the input/output terminals T1 and T2. The main battery 10 supplies a DC input voltage Vdcin between the input/output terminals T1 and T2, and for example, when the switching power supply unit is applied to a car, the unit is connected to a driving inverter or a step-up/step-down converter, and acts as a high voltage battery of, for example, about 350 to 500 V.

The switching circuit 11 is a switching circuit in a full-bridge type having four switching elements Q1 to Q4. Specifically, one end of the switching element Q1 is connected to the high voltage line LH1, and the other end is connected to one end of the switching element Q2 and one end of a winding 21 of the transformer 2 described later. One end of the switching element Q3 is connected to the high voltage line LH1, and the other end is connected to one end of the switching element Q4 and the other end of the winding 21 of the transformer 2. The other end of the switching element Q2 and the other end of the switching element Q4 are connected to the low voltage line LL1 respectively. Each of the switching elements Q1 to Q4 of the embodiment is configured by, for example, a bipolar transistor, IGBT (Insulated Gate Bipolar Transistor), or MOS-FET (Metal Oxide Semiconductor-Field Effect Transistor).

The SW control circuit 12 generates switching control signals S1 to S4 based on a DC output voltage Vdcout detected by the voltage detection section 33 described later, and controls switching operation of each of the switching elements Q1 to Q4 in the switching circuit 11 using the signals.

The transformer 2 has a winding 21 provided at the main battery 10 side, windings 22 (including a pair of windings 22A and 22B) provided at the accessory battery 30 side, and windings 23 (including a pair of windings 23A and 23B) provided at a side of output terminals T5 and T6 described later, and respective windings 21 to 23 are magnetically coupled so as to have polarities equal to one another. The winding 21 is disposed between the other end of the switching element Q1 and one end of the switching element Q4. On the other hand, both ends of the windings 22A and 22B are connected to the rectifier circuit 31 respectively, and both ends of the windings 23A and 23B are connected to the rectifier circuit 41 respectively. Specifically, one end of the winding 22A is connected to an anode of a diode 31D1 in the rectifier circuit 31 described later, one end of the winding 22B is connected to an anode of a diode 31D2 in the rectifier circuit 31 described later, and the other ends of the windings 22A and 22B are commonly connected to each other, and connected to a low voltage line LL3. One end of the winding 23A is connected to an anode of a diode 41D1 in the rectifier circuit 41 described later, one end of the winding 23B is connected to an anode of a diode 41D2 in the rectifier circuit 41 described later, and the other ends of the windings 23A and 23B are commonly connected to each other, and connected to one end of a low voltage line LL4.

The rectifier circuit 31 has two diodes 31D1 and 31D2, and the rectifier circuit 41 has two diodes 41D1 and 41D2. Cathodes of the diodes 31D1 and 31D2 are connected to a high voltage line LH3 commonly to each other, and cathodes of the diodes 41D1 and 41D2 are connected to a high voltage line LH4 commonly to each other. That is, the rectifier circuits 31 and 41 are those in a cathode common type.

The smoothing circuit 32 has an inductor 32L and a capacitor 32C. The inductor 32L is disposed on the high voltage line LH3 in an insertional manner, and one end of the inductor is connected to the cathodes of the diodes 31D1 and 31D2, and the other end is connected to the output terminal T3 via the voltage detection section 33. The capacitor 32C is disposed between the high voltage line LH3 (a portion near the other end of the inductor 32L) and the low voltage line LL3, and the other end of the low voltage line LL3 is connected to the output terminal T4. The accessory battery 30 for driving a not-shown accessory (for example, power window) is connected between the output terminals T3 and T4 to supply the DC output voltage Vdcout (for example, about 14 V).

The voltage detection section 33 detects the DC output voltage Vdcout supplied between the output terminals T3 and T4, and outputs a voltage corresponding to the DC output voltage Vdcout to the SW control circuit 12. As a specific circuit configuration of the voltage detection section 33, for example, a circuit configuration is given, in which a voltage dividing resistance (not shown) disposed between the high voltage line LH3 and the low voltage line LL3 is used to detect the DC output voltage Vdcout and generate a voltage corresponding to the DC output voltage.

The capacitor C2 is disposed between a high voltage line LH4 and a low voltage line LL4 in a position between the rectifier circuit 41 and the switching circuit 42, and acts as a smoothing capacitor.

The switching circuit 42 is a switching circuit in a full-bridge type having four switching elements Q5 to Q8. Specifically, one end of the switching element Q5 is connected to a connection line L41, and the other end is connected to one end of the switching element Q6 and one end of an inductor 43L1 in the smoothing circuit 43 described later. One end of the switching element Q7 is connected to the connection line L41, and the other end is connected to one end of the switching element Q8 and one end of an inductor 43L2 in the smoothing circuit 43 described later. The other end of the switching element Q6 and the other end of the switching element Q8 are connected to the connection line L42 respectively. The switching elements Q5 to Q8 are configured by, for example, a bipolar transistor, IGBT, or MOS-FET.

The SW control circuit 45 generates switching control signals S5 to S8 based on an AC output voltage Vacout detected by the voltage detection section 44 described later, and controls switching operation of each of the switching elements Q5 to Q8 in the switching circuit 42 using the signals.

The smoothing circuit 43 has two inductors 43L1, 43L2 and a capacitor 43C. The inductor 43L1 is disposed on the connection line L41 in an insertional manner, and one end of the inductor 43L1 is connected to the other end of the switching element Q5 and one end of the switching element Q6, and the other end of the inductor is connected to the output terminal T5 via the voltage detection section 44. The inductor 43L2 is disposed on the connection line L42 in an insertional manner, and one end of the inductor 43L2 is connected to the other end of the switching element Q7 and one end of the switching element Q8, and the other end of the inductor is connected to the output terminal T6 via the voltage detection section 44. The capacitor 43C is disposed between the connection line L41 (a portion near the other end of the inductor 43L1) and the connection line L42 (a portion near the other end of the inductor 43L2). The AC output voltage Vacout (so-called commercial power voltage) is supplied between the output terminals T5 and T6, which acts as a power voltage for electric instruments, as described later.

The voltage detection section 44 detects the AC output voltage Vacout supplied between the output terminals T5 and T6, and outputs a voltage corresponding to the detected AC output voltage Vacout to the SW control circuit 45. As a specific circuit configuration of the voltage detection section 44, for example, a circuit configuration is given, in which voltage dividing resistances (not shown) disposed between the connection line L41 and 0 V potential of the SW control circuit 45, and between the connection line L42 and 0 V potential of the SW control circuit 45 are used to detect the AC output voltage Vacout and generate the voltage corresponding to the detected AC output voltage.

Here, the winding 21 corresponds to a specific example of a "first transformer coil" in an embodiment of the invention, the windings 22 (22A, 22B) correspond to a specific example of a "second transformer coil" in an embodiment of the invention, and the windings 23 (23A, 23B) correspond to a specific example of a "third transformer coil" in an embodiment of the invention. Moreover, the main battery 10 corresponds to a specific example of a "first DC power supply" in an embodiment of the invention, and the accessory battery 30 corresponds to a specific example of a "second DC power supply" in an embodiment of the invention. Moreover, the switching circuit 11 corresponds to a specific example of a "first switching circuit" in an embodiment of the invention, the switching circuit 42 corresponds to a specific example of a "second switching circuit" in an embodiment of the invention, and the rectifier circuit 31 corresponds to a specific example of a "rectifier circuit" in an embodiment of the invention. Output terminals T5 and T6 correspond to a specific example of "AC voltage output terminals" in an embodiment of the invention.

Next, operation of the switching power supply unit having a configuration as above is described in detail.

Figure 2:
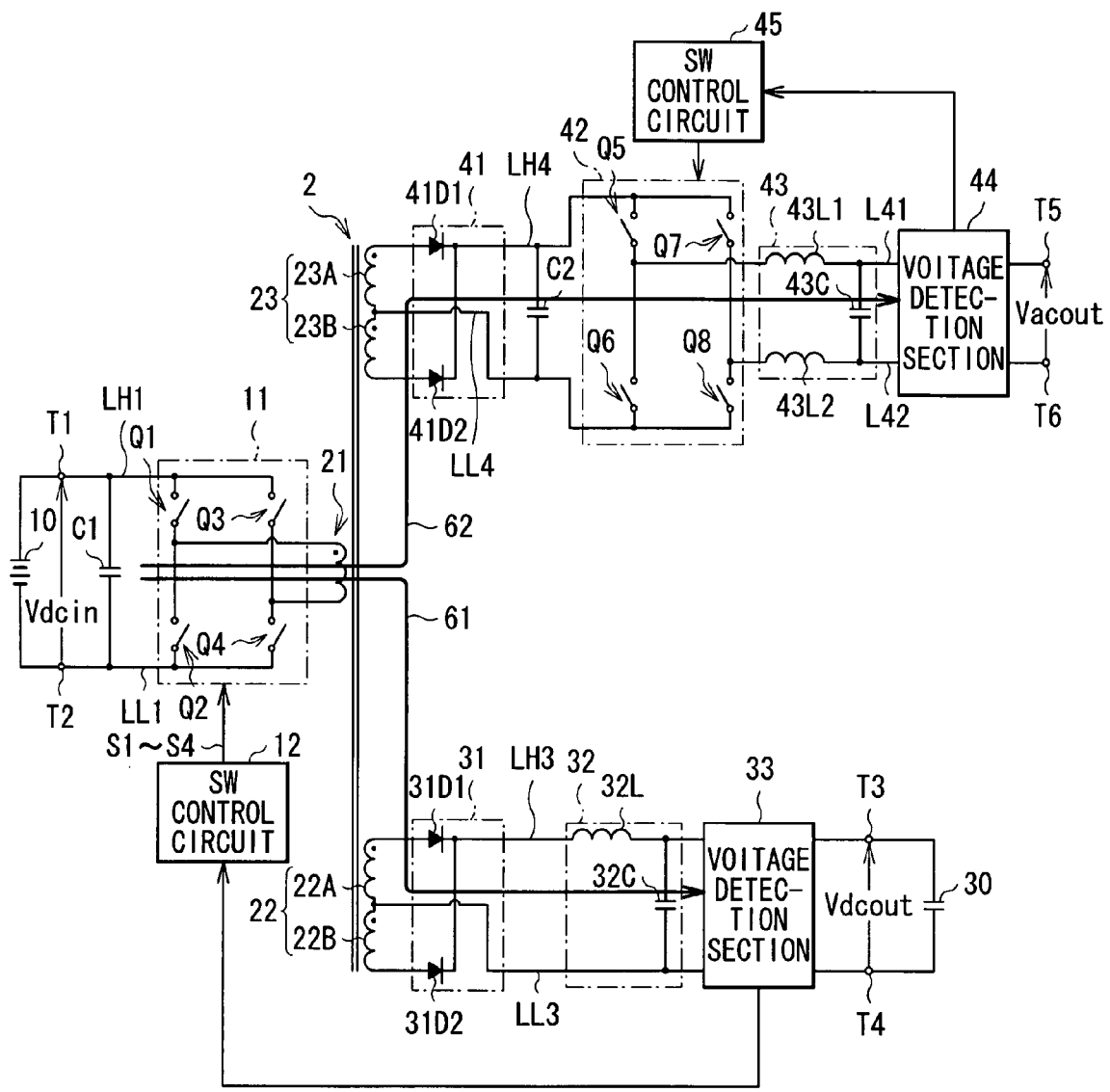
FIG. 2 is a circuit diagram for explaining energy transfer paths in the switching power supply unit of FIG. 1.
Figure 3:
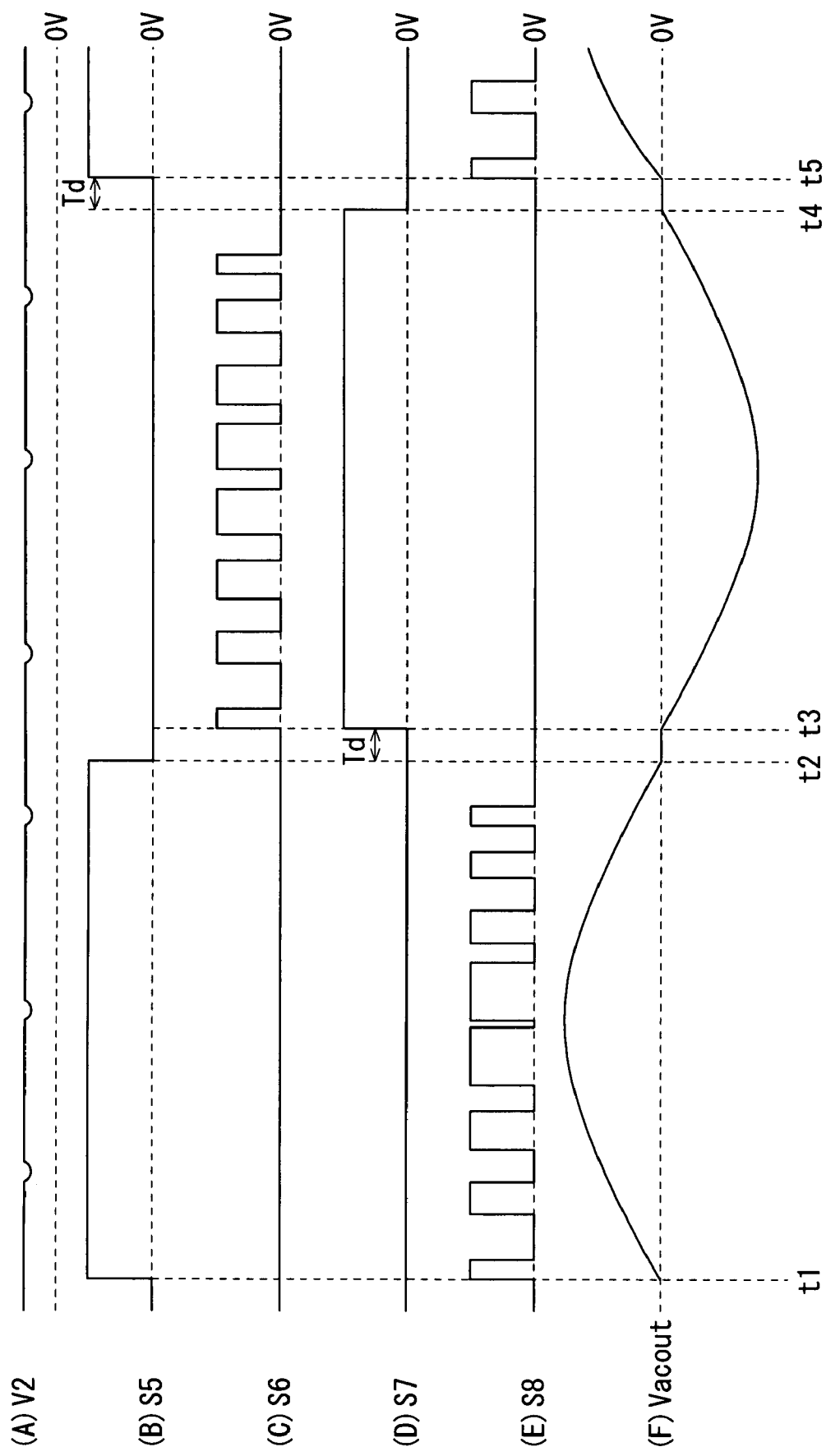
FIGS. 3A to 3F are timing waveform diagrams for explaining operation of generating an AC output voltage in the switching power supply unit of FIG. 1.

First, operation of generating and outputting the DC output voltage Vdcout is described as basic operation of the switching power supply unit with reference to FIGS. 1 and 2.

Here, FIG. 2 schematically shows energy transfer paths in the switching power supply unit of the embodiment using arrows 61 and 62. The energy transfer path 61 in the energy transfer paths 61 and 62 corresponds to the operation of generating and outputting the DC output voltage Vdcout (operation of the DC/DC converter).

First, when a DC input voltage Vdcin is inputted from the main battery 10 via the input/output terminals T1 and T2, the switching circuit 11 acts as an inverter circuit, and switches the DC input voltage Vdcin, so that an AC pulse voltage is generated and supplied to the winding 21 of the transformer 2. Thus, a transformed (here, stepped-down), AC pulse voltage is produced at the windings 22A and 22B of the transformer 2. In this case, a transformation level is determined by a winding ratio of the winding 21 to the windings 22A and 22B.

Next, the transformed AC pulse voltage is rectified by the diodes 31D1 and 31D2 in the rectifier circuit 31. Thus, rectified output is produced between the high voltage line LH3 and the low voltage line LL3.

Next, the smoothing circuit 32 smoothes the rectified output produced between the high voltage line LH3 and the low voltage line LL3, and the DC output voltage Vdcout is thus outputted from the output terminals T3 and T4. The DC output voltage Vdcout is supplied to the accessory battery 30, and used to drive a not-shown accessory. The DC output voltage Vdcout is detected by the voltage detection section 33, and the voltage corresponding to the DC output voltage is outputted to the SW control circuit 12, thereby the switching elements Q1 to Q4 in the switching circuit 11 is subjected to PWM (Pulse Width Modulation) control such that the DC output voltage Vdcout is constant.

In this way, the DC input voltage Vdcin supplied from the main battery 10 is subjected to DC voltage conversion into the DC output voltage Vdcout by the switching circuit 11, windings 21, 22A and 22B of the transformer 2, rectifier circuit 31, and smoothing circuit 32, which collectively act as the DC/DC converter, and then the DC output voltage is outputted from the output terminals T3 and T4. Thus, the accessory battery 30 is subjected to constant-voltage charge, and a not-shown accessory is driven using the DC output voltage.

Next, operation of generating and outputting the AC output voltage Vacout is described as one of features of the switching power supply unit of an embodiment of the invention with reference to FIGS. 1 to 3F. The energy transfer path 62 shown in FIG. 2 corresponds to the operation of generating and outputting the AC output voltage Vacout (operation of the DC/AC inverter).

Here, FIGS. 3A to 3F show an example of the operation of generating and outputting the AC output voltage Vacout by timing waveform diagrams, wherein FIG. 3A shows a voltage V2 between both ends of the capacitor C2, FIGS. 3B to 3E show switching control signals S5 to S8 respectively, and FIG. 3F shows the AC output voltage Vacout. Directions of arrows shown in FIG. 1 show positive directions of the voltages V2 and Vacout respectively.

First, when the DC input voltage Vdcin is inputted from the main battery 10 via the input/output terminals T1 and T2, an AC pulse voltage is generated by the switching circuit 11, and the AC pulse voltage is then supplied to the winding 21 of the transformer 2. Then, a transformed AC pulse voltage is produced at the windings 22A and 22B of the transformer 2, in addition, at the windings 23A and 23B. Again in this case, a transformation level is determined by the winding ratio of the winding 21 to the windings 22A and 22B.

Next, the transformed AC pulse voltage is rectified by the diodes 41D1 and 41D2 in the rectifier circuit 41. Thus, for example, rectified output (voltage V2) as shown in FIG. 3A is produced between the high voltage line LH3 and the low voltage line LL3 (between both ends of the capacitor C2).

Next, the switching circuit 42 acts as an inverter circuit, and the switching elements Q5 to Q8 switch the voltage V2 according to the switching control signals S5 to S8 (see FIGS. 3B to 3F) from the SW control circuit 45.

Specifically, for example, first, the switching control signal S5 normally shows "H" (FIG. 3B) in a period of timing t1 to timing t2, and the switching control signal S8 is gradually increased in pulse width in the first half of the period of timing t1 to timing t2, and gradually decreased in pulse width in the second half of the period of timing t1 to timing t2 as shown in FIG. 3E. Therefore, in the period, the switching element Q5 is in a normally-on state, and the switching element Q8 is in an on/off state given by PWM control. On the other hand, in the period, each of the switching control signals S6 and S7 normally shows "L" (FIGS. 3C and 3D), and each of the switching elements Q6 and Q7 is in a normally-off state. The switching elements Q5 to Q8 perform switching operation in this way, and the smoothing circuit 43 performs smoothing processing, so that the AC output voltage Vacout outputted from the output terminals T5 and T6 has a sinusoidal waveform being convex upward as shown in FIG. 3F in the period of timing t1 to timing t2.

Next, a period of timing t2 to timing t3 corresponds to dead time Td in which all of the switching elements Q5 to Q8 are in an off state (FIGS. 3B to 3E).

Next, the switching control signal S7 normally shows "H" (FIG. 3D) in a period of timing t3 to timing t4, and the switching control signal S6 is gradually increased in pulse width in the first half of the period of timing t3 to timing t4, and gradually decreased in pulse width in the second half of the period of timing t3 to timing t4 as shown in FIG. 3E. Therefore, in the period, the switching element Q7 is in a normally-on state, and the switching element Q6 is in an on/off state given by PWM control. On the other hand, in the period, each of the switching control signals S5 and S8 normally shows "L" (FIGS. 3B and 3E), and each of the switching elements Q5 and Q8 is in a normally-off state. The switching elements Q5 to Q8 perform switching operation in this way, and the smoothing circuit 43 performs smoothing processing, so that the AC output voltage Vacout outputted from the output terminals T5 and T6 has a sinusoidal waveform being convex downward as shown in FIG. 3F in the period of timing t3 to timing t4.

A subsequent period of timing t4 to timing t5 also corresponds to the dead time Td in which all of the switching elements Q5 to Q8 are in the off state (FIGS. 3B to 3E). An operation condition at timing t5 is equivalent to an operation condition at timing t1. After the timing t5, operation in timing t1 to timing t5 is repeated. The AC output voltage Vacout outputted from the output terminals T5 and T6 is detected by the voltage detection section 44, and the voltage corresponding to the AC output voltage is outputted to the SW control circuit 45, thereby the switching elements Q5 to Q8 in the switching circuit 42 are controlled in pulse width such that the AC output voltage Vacout is stabilized.

In this way, in the switching power supply unit of the embodiment, based on the DC input voltage Vdcin inputted from the main battery 10, the DC output voltage Vdcout is generated by the DC/DC converter including the switching circuit 11, SW control circuit 12, windings 21, 22A and 22B of the transformer 2, rectifier circuit 31, and smoothing circuit 33, and outputted from the output terminals T3 and T4, and the AC output voltage Vacout is generated by the DC/AC inverter including the switching circuit 11, windings 21, 23A and 23B of the transformer 2, rectifier circuit 41, switching circuit 42, SW control circuit 45, and smoothing circuit 43, and outputted from the output terminals T5 and T6. Moreover, since a transformer (transformer 2) is shared by the DC/DC converter (generation path of the DC output voltage Vdcout) and the DC/AC inverter (generation path of the AC output voltage Vacout), and a magnetic flux is shared, an installation space of the switching power supply unit as a whole is extremely reduced compared with a case that the transformers for them are separately provided.

As described above, in the embodiment, the switching circuit 11 is provided between the winding 21 of the transformer 2 and the main battery 10, and the rectifier circuit 31 is provided between the windings 22A, 22B of the transformer 2 and the accessory battery 30, and the output terminals T5 and T6 for outputting the AC output voltage Vacout are provided at the other end side (here, a secondary side) of the transformer 2, the AC output voltage being generated based on the DC input voltage Vdcin inputted from the main battery 10. Therefore, the DC output voltage Vdcout and the AC output voltage Vacout can be generated based on the DC input voltage Vdcin, and then outputted. Moreover, the transformer 2 can be shared by the generation path of the DC output voltage Vdcout and the generation path of the AC output voltage Vacout. Accordingly, the switching power supply unit for outputting a DC voltage and an AC voltage can be configured with a minimized installation space compared with a usual case where transformers are provided on respective generation paths.

Second Embodiment

Figure 4:
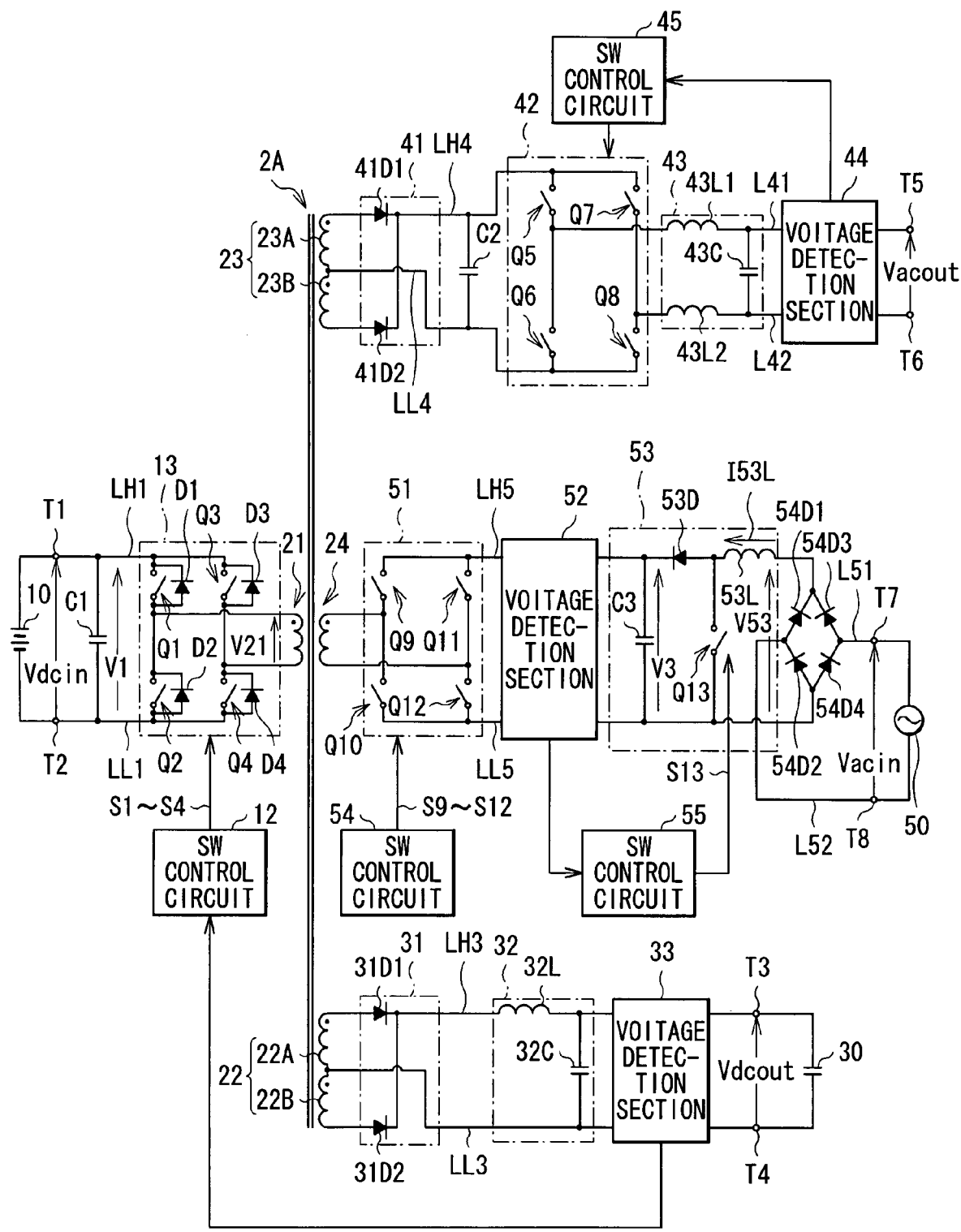
FIG. 4 is a circuit diagram showing a configuration of a switching power supply unit according to a second embodiment of the invention.

Next, a second embodiment of the invention is described.
FIG. 4 shows a circuit configuration of a switching power supply unit according to the embodiment. In the figure, the same components as those shown in FIG. 1 are marked with the same references, and appropriately omitted to be described. The switching power supply unit of the embodiment is configured such that in the switching power supply unit of the first embodiment, a transformer 2A is provided in place of the transformer 2, the transformer 2A being formed by adding a winding 24 to the other side of the transformer 2; a circuit configuration is provided (including a bridge circuit including diodes 54D1 to 54D4 described later, PFC (Power Factor Correction) circuit 53, a switching circuit 51, a voltage detection section 52, and SW control circuits 54, 55), in which an AC input voltage Vacin (so-called commercial power voltage) is inputted from a commercial power supply 50, and a voltage based on the AC input voltage is supplied to the transformer 2A; and a bidirectional switching circuit 13 is provided in place of the switching circuit 11.

The diodes 54D1 to 54D4 are disposed between input terminals T7, T8 and the PFC circuit 53, and configure the bridge circuit as above. Specifically, an anode of the diode 54D1 and a cathode of the diode 54D2 are commonly connected to the input terminal T8 via a connection line L52, and an anode of the diode 54D3 and a cathode of the diode 54D4 are commonly connected to the input terminal T7 via a connection line L51. A cathode of the diode 54D1 and a cathode of the diode 54D3 are commonly connected to one end of a high voltage line LH5 (one end of an inductor 53L in the PFC circuit 53 described later), and an anode of the diode 54D2 and an anode of the diode 54D4 are commonly connected to one end of a low voltage line LL5. The commercial power supply 50 is connected between the input terminals T7 and T8 so that AC input voltage Vacin is inputted.

The PFC circuit 53 has an inductor 53L, a diode 53D, a switching element Q13, and a capacitor C3. The other end of the inductor 53L is connected to an anode of the diode 53D and one end of the switching element Q13, the other end of the switching element Q13 is connected to the low voltage line LL5, and the capacitor C3 is disposed between the high voltage line LH5 (in a portion between the diode 53 and a voltage detection section 52 described later) and the low voltage line LL5 (in a portion between the other end of the switching element Q13 and the voltage detection section 52). The switching element Q13 is configured by, for example, IGBT or MOS-FET. According to such a configuration, while described in detail later, the PFC circuit 53 steps up and stabilizes an input voltage V53 to be inputted into the PFC circuit 53, so that it corrects a power factor. While only the capacitor C3 may be provided in place of the PFC circuit 53, when the PFC circuit 53 of the embodiment is provided, since switching operation of the switching element Q9 can be performed in all ranges of input frequency, a peak current is decreased, consequently a ripple voltage is preferably reduced compared with a smoothing capacitor having the same capacitance.

The voltage detection section 52 detects a voltage V3 between both ends of the capacitor C3, and outputs a voltage corresponding to the detected voltage V3 to the SW control circuit 55. As a specific circuit configuration of the voltage detection section 52, for example, a circuit configuration is given, in which a voltage dividing resistance (not shown) disposed between the connection lines LH5 and LL5 is used to detect the voltage V3 and generate the voltage corresponding to the voltage V3.

The SW control circuit 55 generates a switching control signal S13 based on the voltage V3 detected by the voltage detection section 52, and controls switching operation of the switching element Q13 in the PFC circuit 53 using the signal.

The switching circuit 51 is a switching circuit in a full-bridge type having four switching elements Q9 to Q12. Specifically, one end of the switching element Q9 is connected to the high voltage line LH5, and the other end is connected to one end of the switching element Q10 and one end of the winding 24 of the transformer 2A. One end of the switching element Q11 is connected to the high voltage line LH5, and the other end is connected to one end of the switching element Q12 and the other end of the winding 24 of the transformer 2A. The other end of the switching element Q10 and the other end of the switching element Q12 are connected to the low voltage line LL5 respectively. The switching elements Q9 to Q12 is configured by, for example, a bipolar transistor, IGBT, or MOS-FET.

The SW control circuit 54 generates a switching control signals S9 to S12, and controls switching operation of each of the switching elements Q9 to Q12 in the switching circuit 51 using the signals.

The bidirectional switching circuit 13 is configured such that in the switching circuit 11 described in the first embodiment, each of diodes D1 to D4 is connected in parallel in a reverse direction between both ends of each of the switching elements Q1 to Q4 (a cathode of each diode is connected to a side of the high voltage line LH1, and an anode of each diode is connected to a side of the low voltage line LL1). That is, one switching element and one diode are used to configure one bidirectional switch, and while described in detail later, the bidirectional switching circuit 13 acts as an inverter circuit or a rectifier circuit. When the switching elements Q1 to Q4 are configured by MOS-FET and have parasitic diode components respectively, the parasitic diode components may be used in place of the diodes D1 to D4.

Here, the bidirectional switching circuit 13 corresponds to a specific example of a "first switching circuit" of an embodiment of the invention, and the switching circuit 51 corresponds to a specific example of a "third switching circuit" of an embodiment of the invention. The winding 24 corresponds to a specific example of a "fourth transformer coil" of an embodiment of the invention.

Figure 5:
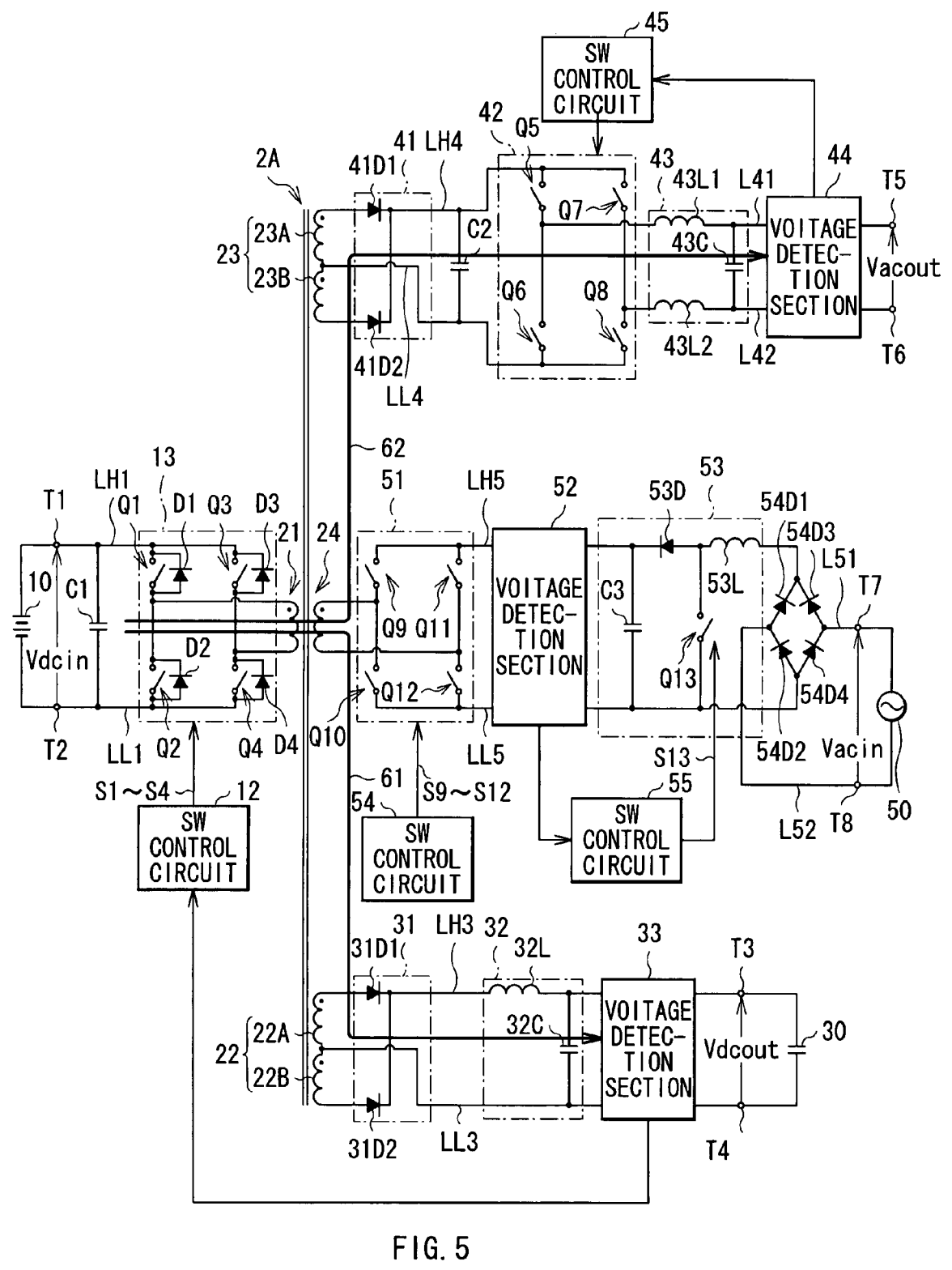
Figure 6:
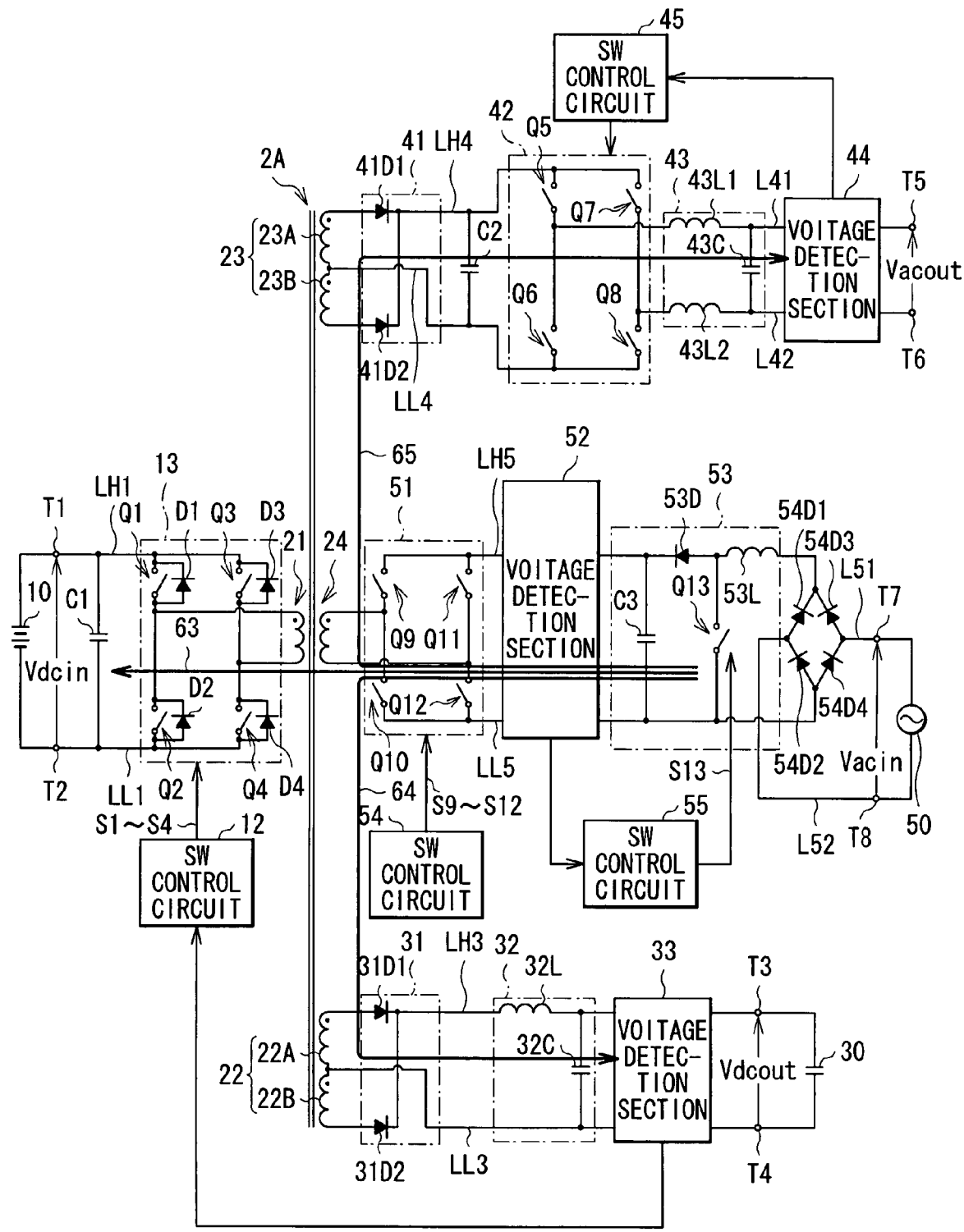
FIG. 6 is a circuit diagram for explaining another example of energy transfer paths in the switching power supply unit of FIG. 4.
Figure 7:
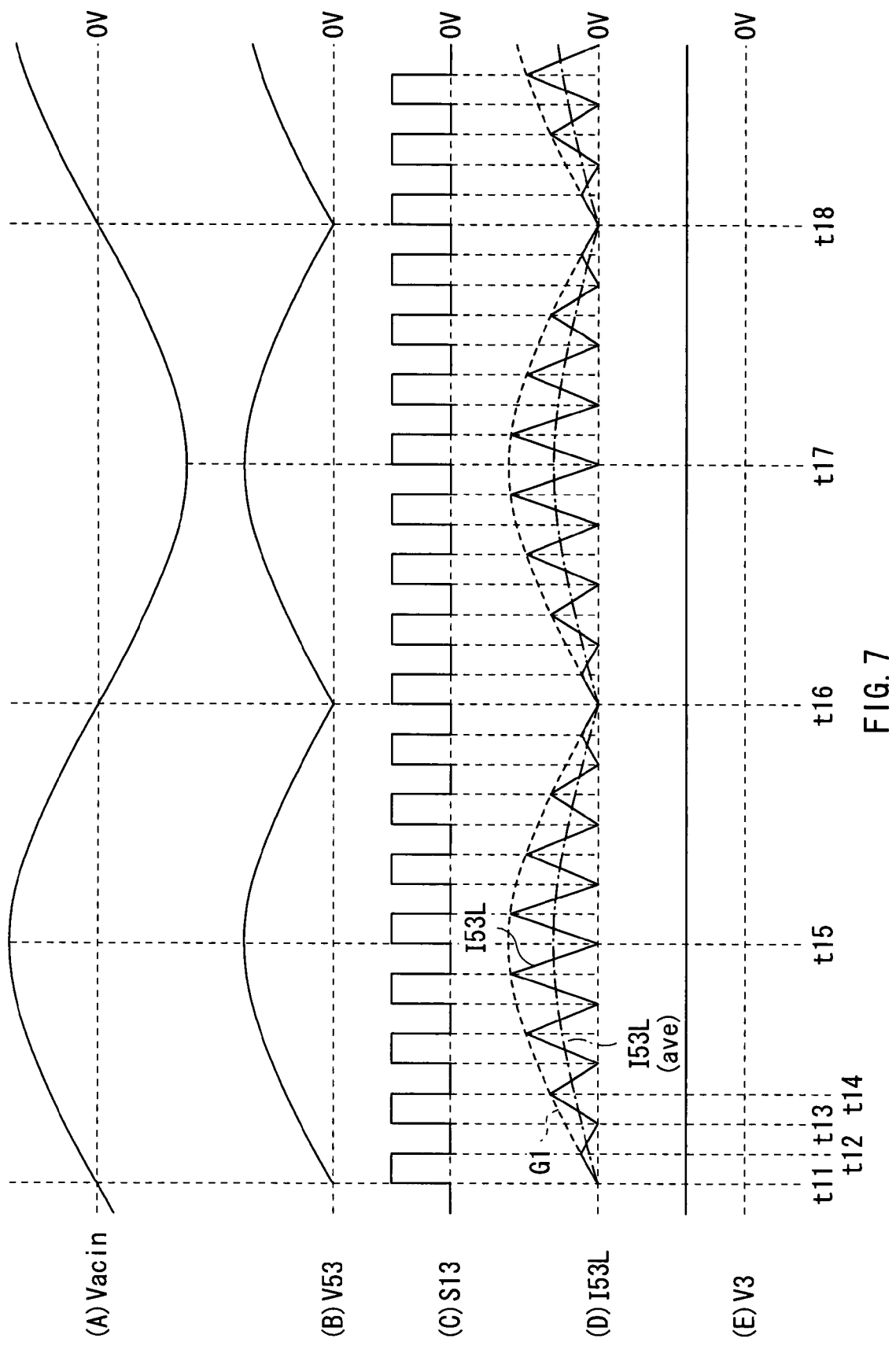
FIGS. 7A to 7E are timing waveform diagrams for explaining a conversion operation from an AC input voltage into a DC voltage in the switching power supply unit of FIG. 4.
Figure 8:
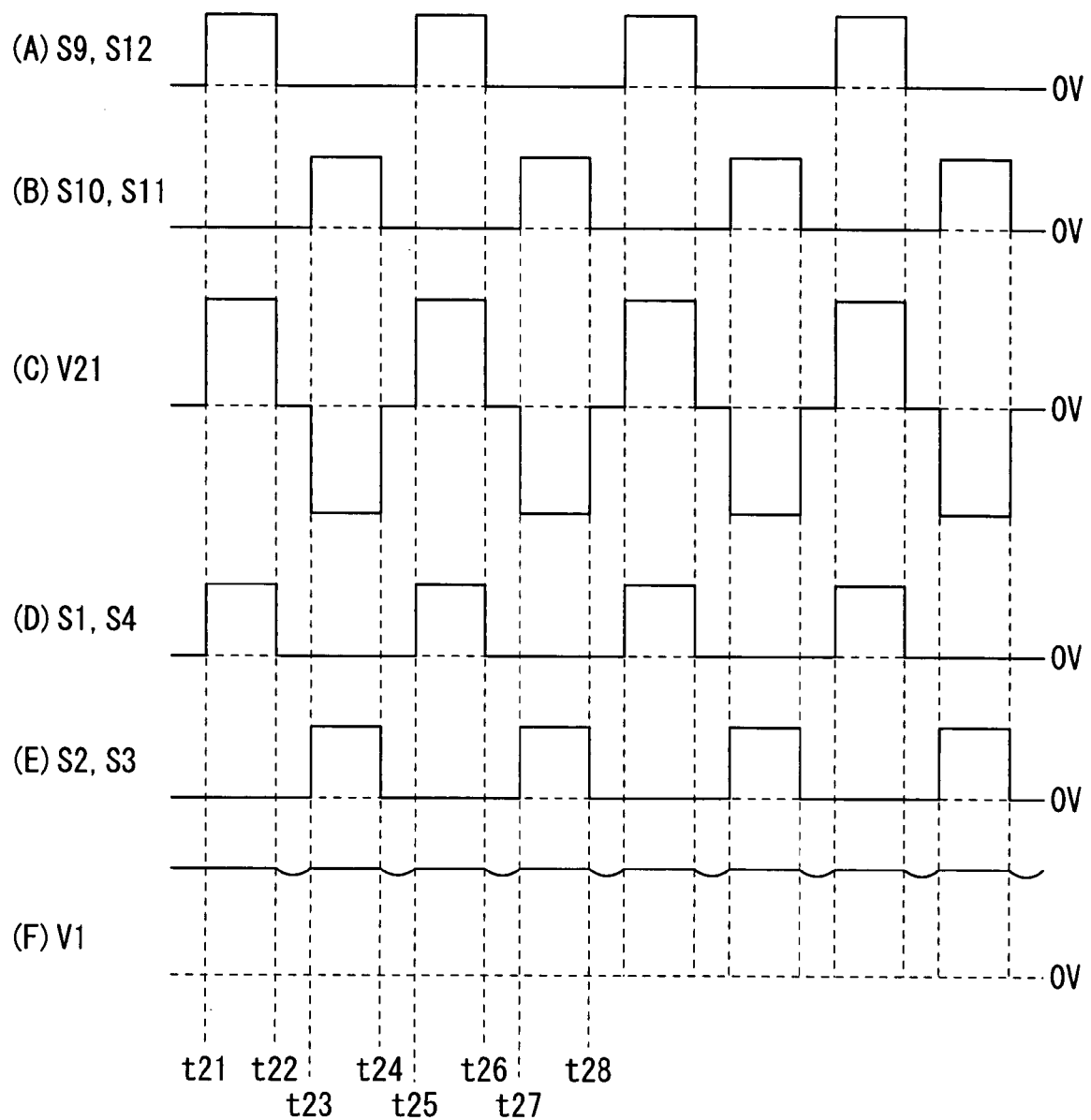
FIG. 8A to 8F are timing waveform diagrams for explaining charging operation of the main battery and the accessory battery in the switching power supply unit of FIG. 4.

Next, operation of the switching power supply unit of the embodiment is described in detail with reference to FIGS. 4 to 8. Here, FIG. 5 schematically shows energy transfer paths by arrows 61 and 62 in the case that the DC output voltage Vdcout and the AC output voltage Vacout are generated based on the DC input voltage Vdcin and then outputted as in the first embodiment. FIG. 6 schematically shows energy transfer paths by arrows 63 to 65 in the case that the AC input voltage Vacin is inputted from the commercial power supply 50, and FIGS. 7A to 7E and FIGS. 8A to 8F show operation waveforms in such a case by timing waveform diagrams. Specifically, FIGS. 7A to 7E show operation waveforms before the voltage V3 between both ends of the capacitor C3 is generated based on the AC input voltage Vacin, wherein FIG. 7A shows the AC input voltage Vacin, FIG. 7B shows an input voltage (output voltage from the bridge circuit formed by the diodes 54D1 to 54D4) V53 into the PFC circuit 53, FIG. 7C shows a switching control signal S13, FIG. 7D shows a current 153L flowing through the inductor L53, and FIG. 7E shows the voltage V3 between both ends of the capacitor C3, respectively. FIGS. 8A to 8F show operation waveforms before the capacitor C1 is charged (the main battery 10 is charged) based on the voltage V3, wherein FIG. 8A shows switching control signals S9 and S12, FIG. 8B shows switching control signals S10 and S11, FIG. 8C shows a voltage V21 generated between both ends of the winding 21 of the transformer 2A, FIG. 8D shows switching control signals S1 and S4, FIG. 8E shows switching control signals S2 and S3, and FIG. 8F shows the voltage V1 generated between both ends of the capacitor C1, respectively. Directions of arrows shown in FIG. 4 show positive directions of the AC input voltage Vacin, the voltages V53, V3 and V21, and the current 153L respectively.

First, when the DC output voltage Vdcout and the AC output voltage Vacout are generated based on the DC input voltage Vdcin and then outputted as shown in FIG. 5, the same operation as operation described in the first embodiment is performed, therefore description of the operation is omitted. For example, when the switching power supply unit of the embodiment is applied to a car, operation in this case corresponds to operation in a case that power is supplied from a motor drive inverter or a step-up/step-down converter to the main battery 10, and thus the accessory battery 30 drives an accessory and outputs the AC output voltage Vacout to external equipment, that is, operation during engine operation (during car running).

Next, operation in the case that the AC input voltage Vacin is inputted from the commercial power supply 50 is described in detail with reference to FIG. 4 and FIGS. 6 to 8. For example, when the switching power supply unit of the embodiment is applied to a car, operation in this case corresponds to operation in a case that the AC input voltage Vacin is inputted from the commercial power supply 50 since an engine is stopped, thereby at least one of the main battery 10 and the accessory battery 30 is charged, and the AC output voltage Vacout is outputted to external equipment, that is, operation during engine stopping.

First, operation through the energy transfer paths 63 and 64 as shown in FIG. 6 (operation of charging the main battery 10 or the accessory battery 30 based on the AC input voltage Vacin) is described.

First, when the AC input voltage Vacin (commercial power voltage) as shown in FIG. 7A is inputted from the commercial power supply 50 via the input terminals T7 and T8, the AC input voltage Vacin is rectified by the bridge circuit including the diodes 54D1 to 54D4, so that a voltage V5 as shown in FIG. 7B is generated, and the voltage is inputted into the PFC circuit 53. During this, the switching element Q13 repeats on/off operation as shown in FIG. 7C (for example, on state in periods of timing t11 to timing t12 and timing t13 to timing t14, and off state in a period of timing t12 to timing t13), as a result, the current 153L flowing through the inductor 53L shows a triangular waveform as shown in FIG. 7D, and as shown by a sign G1, a locus formed by peak voltages of such a triangular wave shows a sinusoidal waveform with each of periods of timing t11 to timing t16, timing t16 to timing t18 . . . as half cycle, respectively. A current 153L (ave) shown in FIG. 7D shows an average current of the current 153L. In this way, operation of the PFC circuit 53 results in that a DC voltage having a constant value is obtained as the voltage V3 between both ends of the capacitor C3 as shown in FIG. 7F.

Next, the main battery 10 and the accessory battery 30 are charged through the energy transfer paths 63 and 64 based on the voltage V3 stored between both ends of the capacitor C3. First, along the energy transfer path 63, the switching circuit 51 acts as an inverter circuit, and the switching elements Q9 to Q12 perform on/off operation as shown in timing t21 to timing t28 and the like in FIGS. 8A and 8B, thereby an AC pulse voltage is generated at the winding 24 of the transformer 2A. Then, a transformed AC pulse voltage V21 as shown in FIG. 8C is generated between both ends of the winding 21 depending on a winding ratio of the winding 24 to the winding 21. Next, the bidirectional switching circuit 13 acts as a rectifier circuit in this case, and the switching elements Q1 to Q4 perform on/off operation as shown in FIGS. 8D and 8E, thereby the AC pulse voltage V21 is rectified, consequently a constant DC voltage V1 as shown in FIG. 8F is applied between both ends of the capacitor C1. In this way, the main battery 10 is charged based on the voltage V1.

On the other hand, along the energy transfer path 64, when the AC pulse voltage is generated at the winding 24 of the transformer 2A as above, a transformed AC pulse voltage is produced also at the windings 22A and 22B of the transformer 2A, the AC pulse voltage being determined by the winding ratio of the winding 24 to the windings 22A and 22B. Consequently, the transformed AC pulse voltage is rectified by the rectifier circuit 31, then smoothed by the smoothing circuit 32, thereby the accessory battery 30 is similarly charged based on a constant voltage.

Moreover, along the energy transfer path 65, when the Ac pulse voltage is generated at the winding 24 of the transformer 2A as above, a transformed AC pulse voltage is produced also at the windings 23A and 23B of the transformer 2A, the AC pulse voltage being determined by the winding ratio of the winding 24 to the windings 23A and 23B. Consequently, the transformed AC pulse voltage is rectified by the rectifier circuit 41, thereby a DC voltage is applied to the capacitor C2. Accordingly, the AC output voltage Vacout is then outputted from the output terminals T5 and T6 in the same way as in the first embodiment.

In this way, in the switching power supply unit of the embodiment, at least one of the main battery 10 and the accessory battery 30 is charged based on the AC input voltage Vacin (commercial power voltage) inputted from the commercial power supply 50, and the AC output voltage Vacout is generated based on the AC input voltage and outputted from the output terminals T5 and T6. Moreover, since the respective energy transfer paths 63 to 65 share a transformer (transformer 2A) with one another, and thus share a magnetic flux, an installation space of the switching power supply unit as a whole is extremely reduced compared with a case that transformers are separately provided on respective paths.

As described above, in the embodiment, the circuit configuration is provided, in which the AC input voltage Vacin (so-called commercial power voltage) is inputted from the commercial power supply 50, and the voltage based on the AC input voltage is supplied to the transformer 2A. Therefore, the advantages of first embodiment are obtained, in addition, the AC input voltage Vacin can be inputted in order to charge at least one of the main battery 10 and the accessory battery 30, and generate the AC output voltage Vacout and output the AC output voltage from the output terminals T5 and T6. Moreover, since the transformer 2A can be shared, a switching power supply unit can be configured with a minimized installation space compared with a case that transformers are separately provided on respective paths.

Moreover, the AC input voltage Vacin may be subjected to voltage conversion to generate and output an AC output voltage Vacout being an accurate commercial power voltage.

Third Embodiment

Next, a third embodiment of the invention is described.

Figure 9:
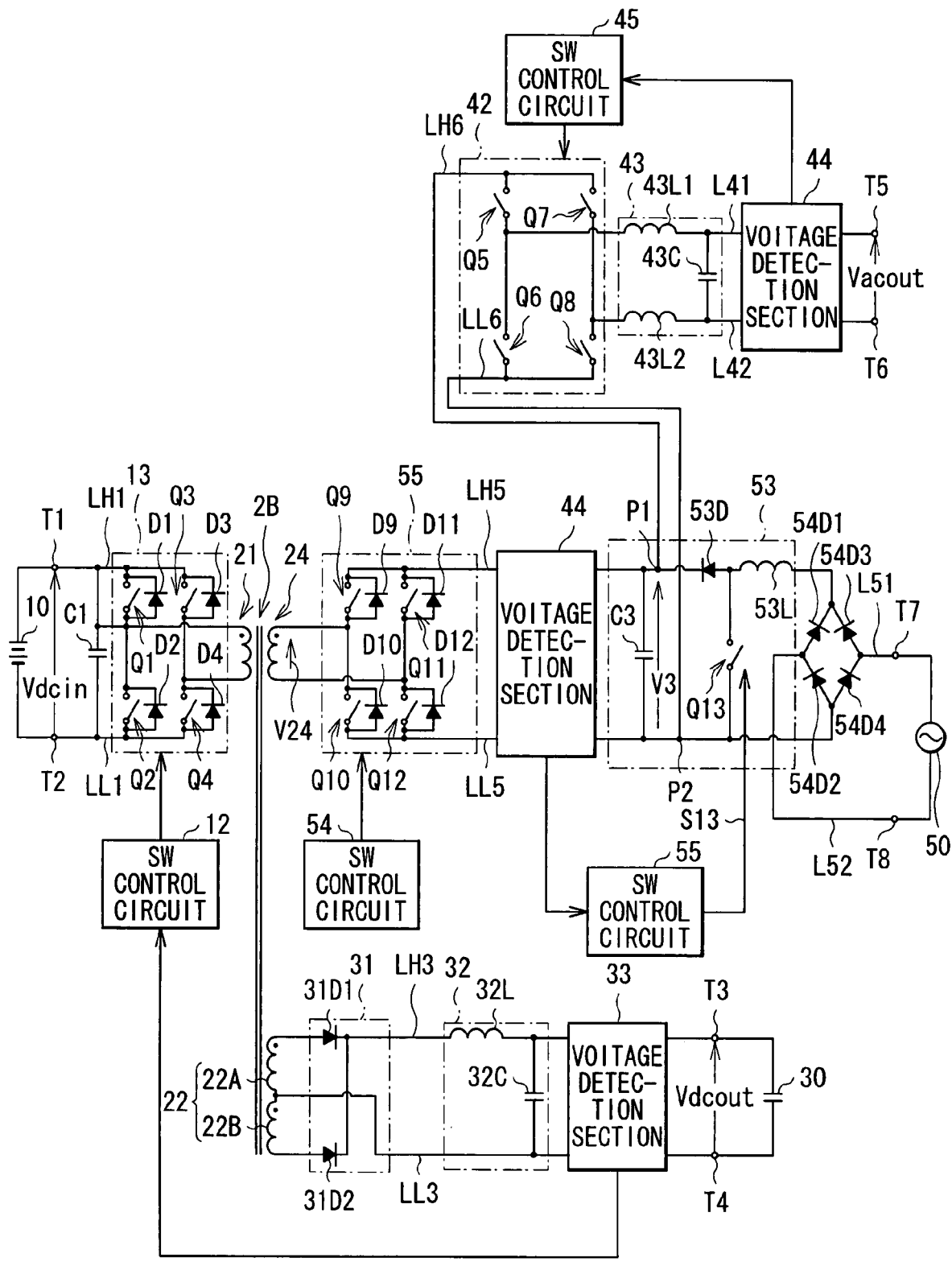
FIG. 9 is a circuit diagram showing a configuration of a switching power supply unit according to a third embodiment of the invention.

FIG. 9 shows a circuit configuration of a switching power supply unit according to the embodiment. In the figure, the same components as those shown in FIGS. 1 and 4 are marked with the same references, and appropriately omitted to be described. The switching power supply unit is configured such that in the switching power supply unit of the second embodiment, a transformer 2B is provided in place of the transformer 2A, the transformer 2B being formed by removing the windings 23A and 23B from the other side of the transformer 2A, a bidirectional switching circuit 55 is provided in place of the switching circuit 51, and the bidirectional switching circuit 55 is disposed between the winding 24 and the switching circuit 42 (output terminals T5 and T6). That is, the bidirectional switching circuit 55 is shared by a circuit to be inputted with the AC input voltage Vacin and a circuit for outputting the AC output voltage Vacout.

The bidirectional switching circuit 55 is configured such that in the switching circuit 51 described in the second embodiment, each of diodes D9 to D12 is connected in parallel in a reverse direction between both ends of each of the switching elements Q9 to Q12 (a cathode of each diode is connected to a side of the high voltage line LH5, and an anode of each diode is connected to a side of the low voltage line LL5). That is, one switching element and one diode are used to configure one bidirectional switch, and while described in detail later, the bidirectional switching circuit 55 acts as an inverter circuit or a rectifier circuit. When the switching elements Q9 to Q12 are configured by MOS-FET and have parasitic diode components respectively, the parasitic diode components may be used in place of the diodes D9 to D12.

In the embodiment, a switching circuit 42 is connected to connection points P1 and P2 to both ends of the capacitor C3 via a high voltage line LH6 and a low voltage line L6 respectively.

Figure 10:
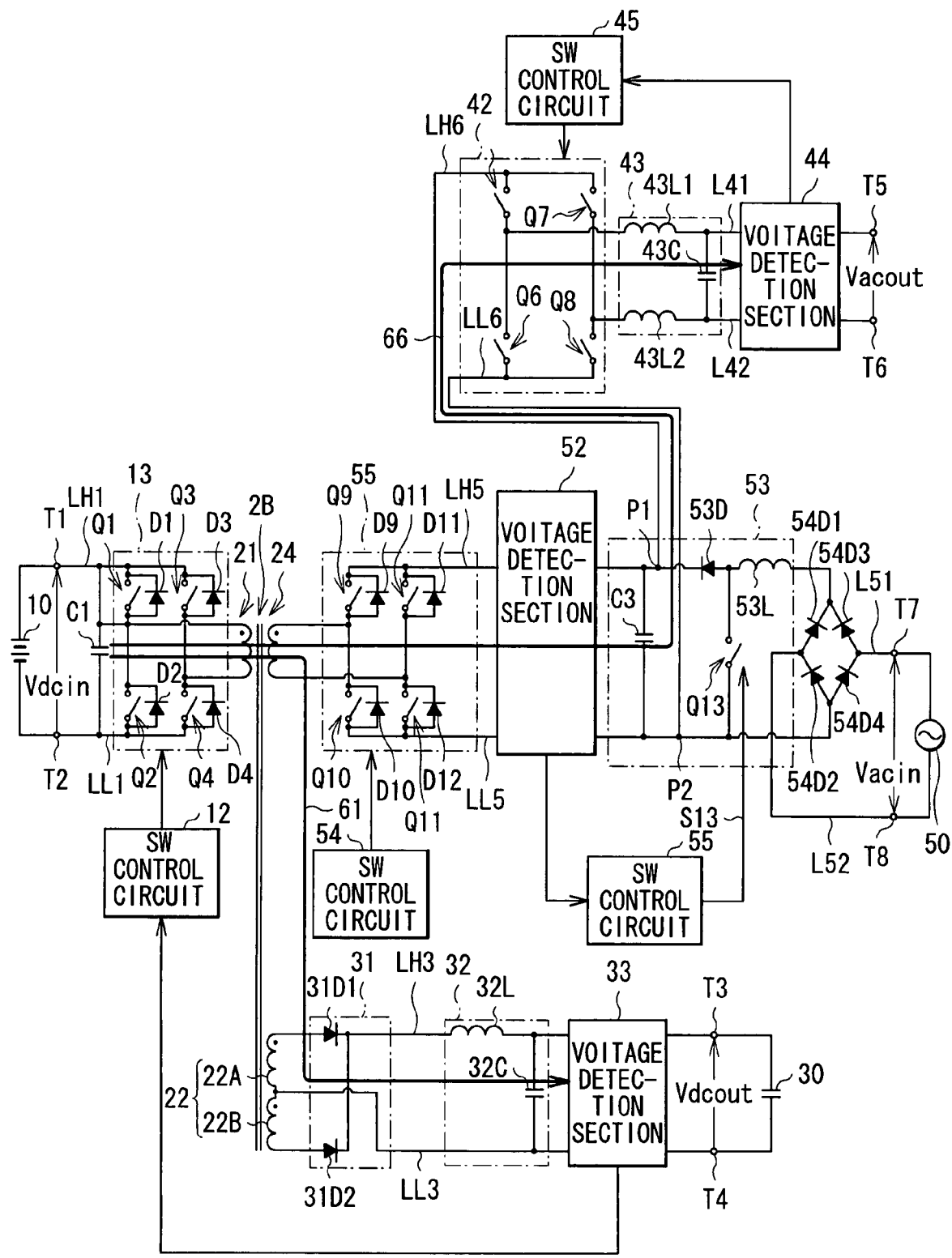
FIG. 10 is a circuit diagram for explaining an example of energy transfer paths in the switching power supply unit of FIG. 9.
Figure 11:
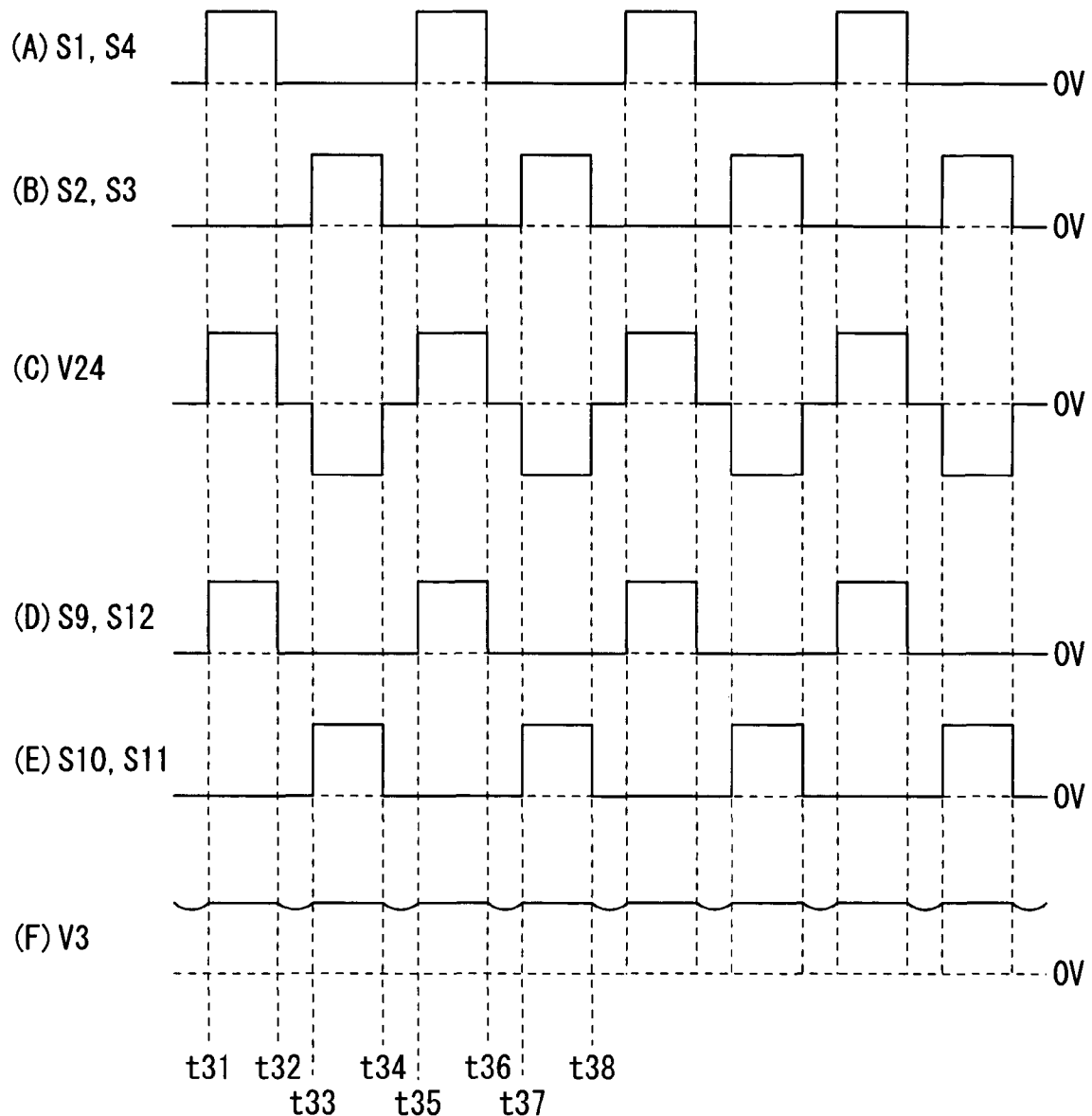
FIGS. 11A to 11F are timing waveform diagrams for explaining conversion operation of a DC input voltage in the switching power supply unit of FIG. 9.
Figure 12:
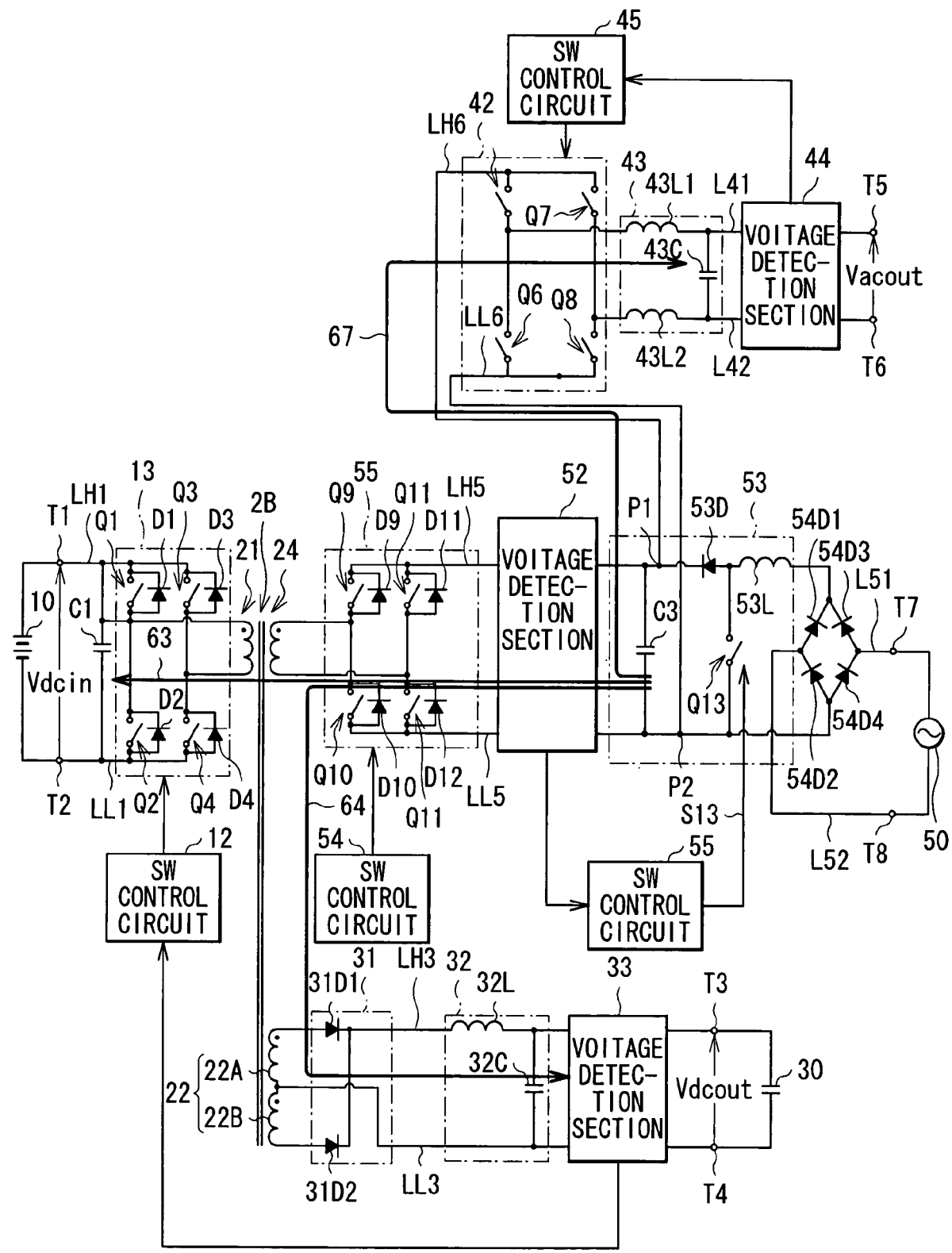
FIG. 12 is a circuit diagram for explaining another example of energy transfer paths in the switching power supply unit of FIG. 9.

Next, operation of the switching power supply unit of the embodiment is described in detail with reference to FIGS. 9 to 12. Here, FIG. 10 schematically shows energy transfer paths by arrows 61 and 65 in the case that the DC output voltage Vdcout and the AC output voltage Vacout are generated based on the DC input voltage Vdcin and then outputted as in the first and second embodiments (for example, during engine operation (during car running)), and FIGS. 11A to 11F show operation waveforms through the energy transfer path 65 in the energy transfer paths by timing wave form diagrams. Specifically, FIG. 11A shows switching control signals S1 and S4, FIG. 11B shows switching control signals S2 and S3, FIG. 11C shows a voltage V24 generated between both ends of the winding 24 of the transformer 2B, FIG. 11D shows switching control signals S9 and S10, FIG. 11E shows switching control signals S10 and S11, and FIG. 11F shows the voltage V3 between both ends of the capacitor C3, respectively. FIG. 12 schematically shows energy transfer paths by arrows 63, 64 and 67 in the case that the AC input voltage Vacin is inputted from the commercial power supply 50 (for example, during engine stopping) as in the second embodiment.

First, when the DC output voltage Vdcout is generated based on the DC input voltage Vdcin and then outputted as shown in FIG. 10, the same operation (operation through the energy transfer path 61) as operation described in the first and second embodiments is performed, therefore description of the operation is omitted.

When the AC output voltage Vacout is generated based on the DC input voltage Vdcin and then outputted as shown in FIG. 10, basically the same operation (operation through the energy transfer path 66) as operation described in the second embodiment is performed. As a different point of the embodiment from the second embodiment, the bidirectional switching circuit 55 acts as a rectifier circuit, and an AC pulse voltage generated at the winding 21 of the transformer 2B is transformed and rectified by the bidirectional switching circuit 55, for example, as shown in timing t31 to timing t38 in FIGS. 11A to 11F, thereby the constant DC voltage V3 is applied between both ends of the capacitor C3. After that, the same operation as operation described in the first embodiment (FIG. 3) is performed, that is, the AC output voltage Vacout is generated from the voltage V2 between both ends of the capacitor C2 and then outputted. Therefore, description of the operation is omitted.

On the other hand, among respective kinds of operation in the case that the AC input voltage Vacin is inputted from the commercial power supply 50 as shown in FIG. 12 (respective kinds of operation through energy transfer paths 64, 64 and 67), operation through each of the energy transfer paths 63 and 64, that is, operation of charging the main battery 10 and the accessory battery 30 based on the AC input voltage Vacin is the same as that described in the second embodiment. Therefore, description of the operation is omitted. Moreover, operation through the energy transfer path 67, that is, operation of outputting the AC output voltage Vacout from the output terminals T5 and T6 based on the AC input voltage Vacin is basically the same as that described in the second embodiment. As a different point of the embodiment from the second embodiment, while the AC output voltage Vacout is generated based on the voltage V2 stored in the capacitor C2 in the second embodiment, the AC output voltage Vacout is generated based on the voltage V3 stored in the capacitor C3 in the embodiment.

In this way, again in the switching power supply unit of the embodiment, at least one of the main battery 10 and the accessory battery 30 is charged based on the AC input voltage Vacin (commercial power voltage) inputted from the commercial power supply 50, and the AC output voltage Vacout is generated based on the AC input voltage and then outputted from the output terminals T5 and T6. Moreover, since the respective energy transfer paths 63, 64 and 67 share a transformer (transformer 2B) with one another, and thus share a magnetic flux, an installation space of the switching power supply unit as a whole is extremely reduced compared with a case that transformers are separately provided on respective paths. Moreover, since the bidirectional switching circuit 55 is shared by the circuit to be inputted with the AC input voltage Vacin and the circuit for outputting the AC output voltage Vacout, the advantages of the second embodiment is given, in addition, the number of components can be decreased by number of components corresponding to the windings 23A, 23B and the rectifier circuit 41, leading to decrease in component cost.

While the invention was described with the first to third embodiments hereinbefore, the invention is not limited to the embodiments, and can be variously modified or altered.

For example, while a case that the circuit for generating and outputting the AC output voltage Vacout and the terminals T5 and T6 are provided at the other side of the transformer (accessory battery 30 side) was described in the embodiments, they may be provided at one side of the transformer (main battery 10 side).

Moreover, while a case that any of the switching circuits 11, 42 and 51 and the bidirectional switching circuits 13 and 55 is a switching circuit in the full-bridge type was described in the embodiments, a configuration of a switching circuit is not limited to this, and for example, the switching circuit may be configured by a switching circuit in a half-bridge type.

Furthermore, while a case that any of the switching elements of the bidirectional switching circuits 13 and 55 performs switching operation with a fixed pulse width, for example, as shown in FIGS. 11A to 11F, was described in the embodiments, for example, it may be designed that switching elements of the bidirectional switching circuit 55 perform switching operation with a fixed pulse width, switching elements of the bidirectional switching circuit 13 perform switching operation with a valuable pulse width, so that a charging level of the main battery 10 can be adjusted.

Obviously many modifications and variations of the present invention are possible in the light of the above teachings. It is therefore to be understood that within the scope of the appended claims the invention may be practiced otherwise than as specifically described.

What is claimed is:

1. A switching power supply unit, comprising:
    a transformer including a first transformer coil, a second transformer coil, a third transformer coil, and a fourth transformer coil, each of the transformer coils being magnetically coupled with each other,
    a first switching circuit disposed between the first transformer coil and a first DC power supply,
    a rectifier circuit disposed between the second transformer coil and a second DC power supply,
    a second switching circuit disposed between the third transformer coil and AC voltage output terminals, and
    a third switching circuit disposed between the fourth transformer coil and AC voltage input terminals, wherein
    the first switching circuit is configured to include a bidirectional switch.

2. The switching power supply unit according to claim 1:
    wherein a power factor correction circuit is further provided between the third switching circuit and the AC voltage input terminals.

3. The switching power supply unit according to claim 2:
    wherein the third switching circuit is configured to include a bidirectional switch, and disposed between the third transformer coil and the AC voltage output terminals.

4. The switching power supply unit according to claim 3:
    wherein the second switching circuit is disposed between the third switching circuit and the AC voltage output terminals.

5. The switching power supply unit according to claim 1:
    wherein the third transformer coil also serves as the fourth transformer coil, and
    the third switching circuit is configured to include a bidirectional switch, and disposed between the third transformer coil and the AC voltage output terminals.

6. The switching power supply unit according to claim 5:
    wherein the second switching circuit is disposed between the third switching circuit and the AC voltage output terminals.

* * * * *